United States Patent [19]
Buckley

[11] Patent Number: 5,142,701
[45] Date of Patent: Aug. 25, 1992

[54] MOTOR VEHICLE RADIO-CASSETTE CAMOUFLAGE SYSTEM

[76] Inventor: Alan Buckley, 162 W. 21 St., New York, N.Y. 10011

[21] Appl. No.: 399,618

[22] Filed: Aug. 28, 1989

Related U.S. Application Data

[63] Continuation-in-part of Ser. No. 182,732, Apr. 18, 1988, Pat. No. 4,918,750.

[51] Int. Cl.$^5$ .............................................. H04B 1/08
[52] U.S. Cl. ..................................... 455/345; 455/349
[58] Field of Search ............................. 455/345–349, 455/351; 360/137; 369/11; 248/313, 223.4; 220/62, 352; 206/387; 312/7.1

[56] References Cited

U.S. PATENT DOCUMENTS

| | | | |
|---|---|---|---|
| 4,365,280 | 12/1982 | Crosetti et al. | 455/345 |
| 4,562,595 | 12/1985 | Bauer et al. | 455/345 |
| 4,584,717 | 4/1986 | Strickland | 455/345 |

*Primary Examiner*—Curtis Kuntz
*Attorney, Agent, or Firm*—Edward Callahan

[57] ABSTRACT

A theft prevention radio-cassette unit camouflage system for a radio-cassette unit removably mounted in the dashboard of a motor vehicle. The radio-cassette unit camouflage system includes a cover removably positioned at the dashboard for concealing the radio-cassette unit from view and a tongue member connected to the cover removably positioned in the cassette recess of the radio-cassette so as to act as a keeper which holds the cover in place over the radio-cassette unit. The tongue member is adapted to be positioned in the cassette recess of a soft-load cassette with the tongue member constructed and arranged to avoid the switch for the motor of the mechanical loader when positioned in the cassette recess. Another embodiment of the tongue member is adapted to avoid both the motor switch and the engaging finger of the soft-load radio-cassette unit. The tongue member is removably positioned in the cassette recess by way of a hook-and-loop fastener mounted to a base at the inner end of the tongue member and to and covering the inner surface of the cover so that the tongue member can be positioned at any position on the cover in accordance with the various cassette recess locations of different models and manufacturers of radio-cassette units.

9 Claims, 9 Drawing Sheets

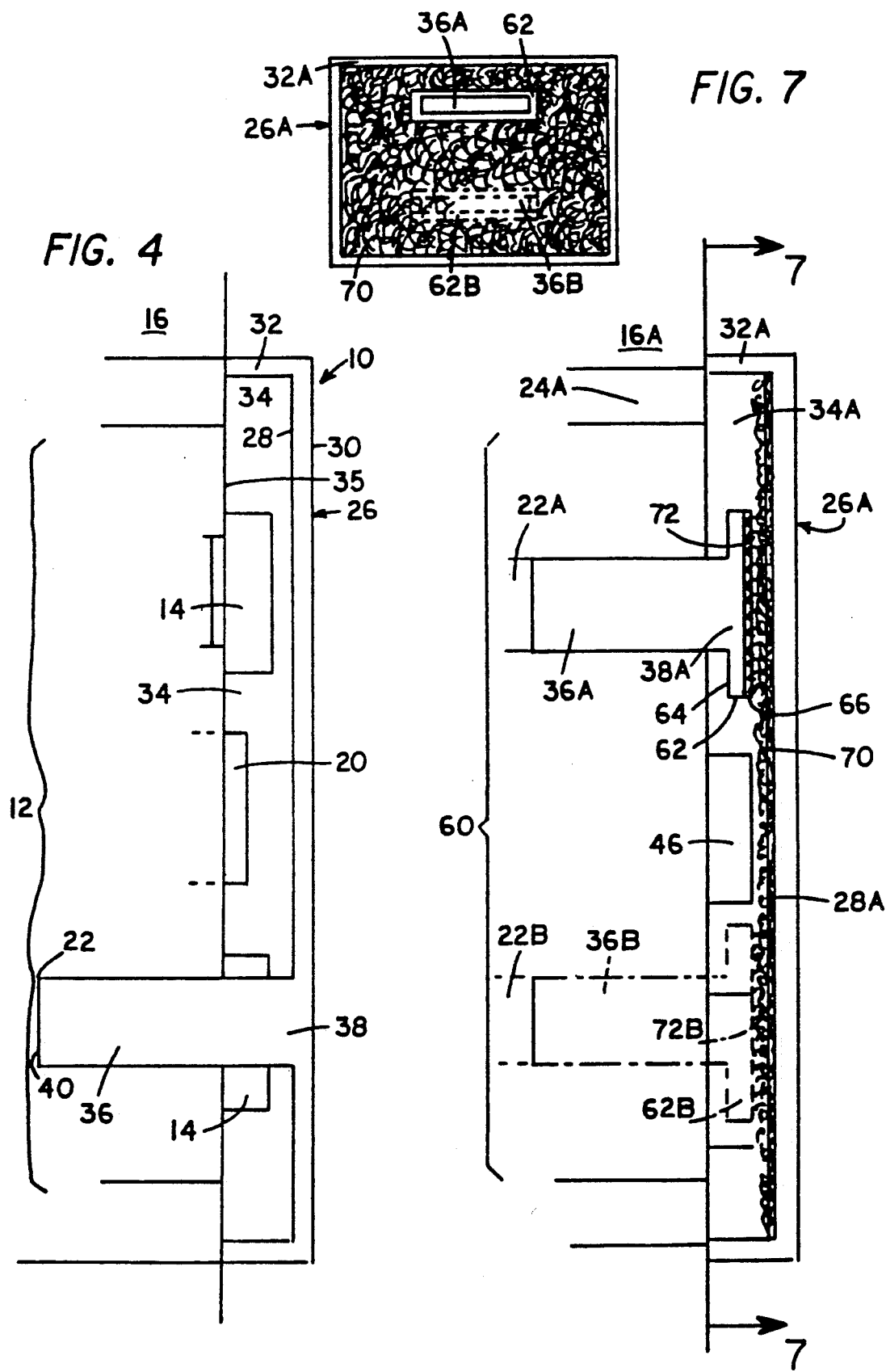

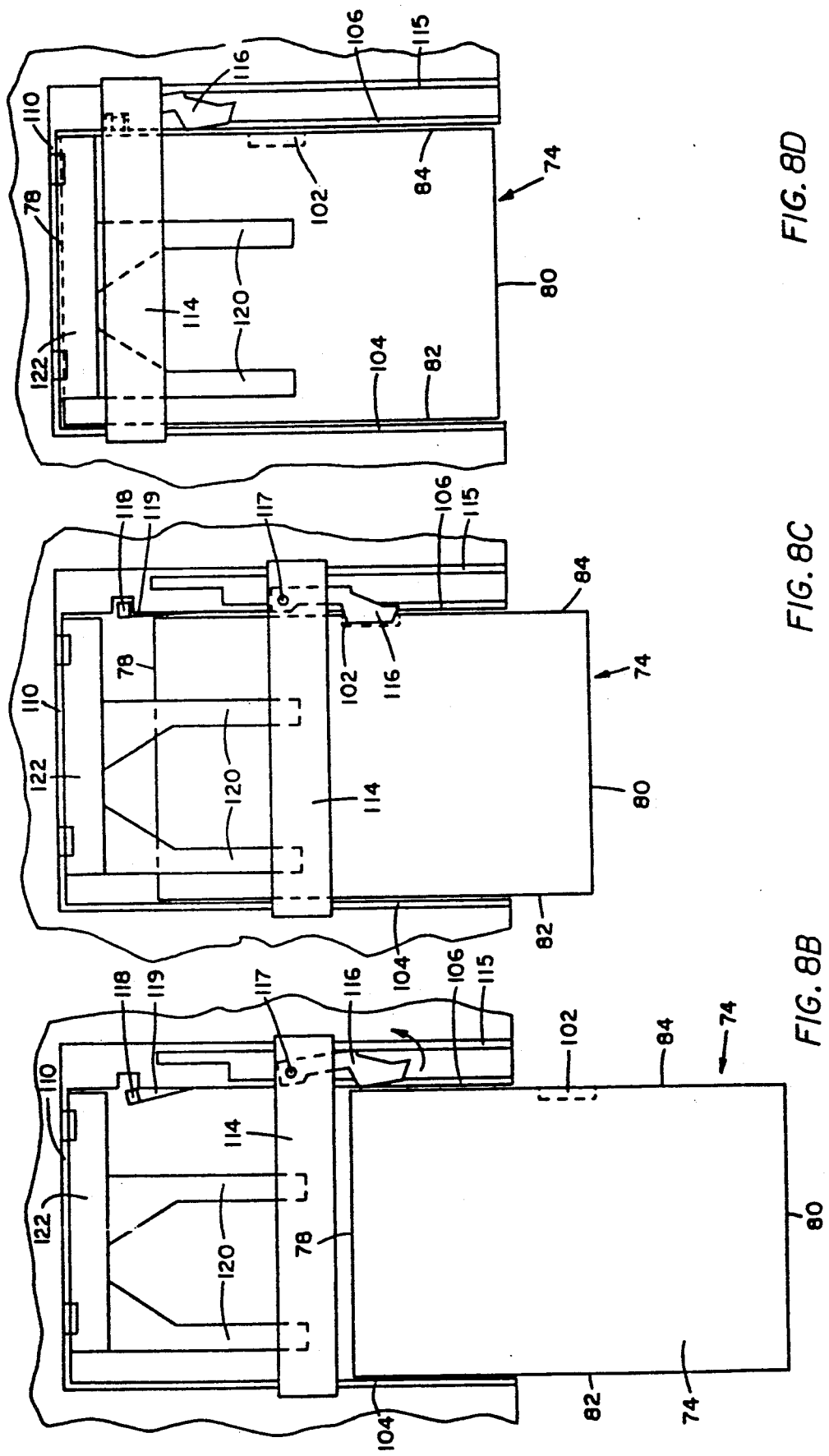

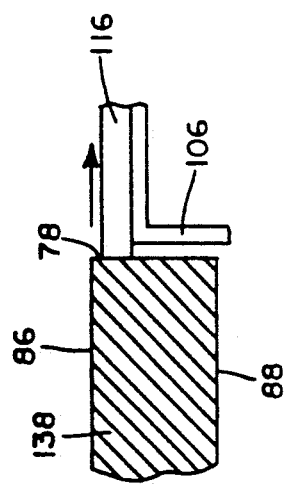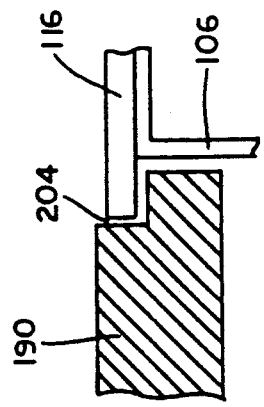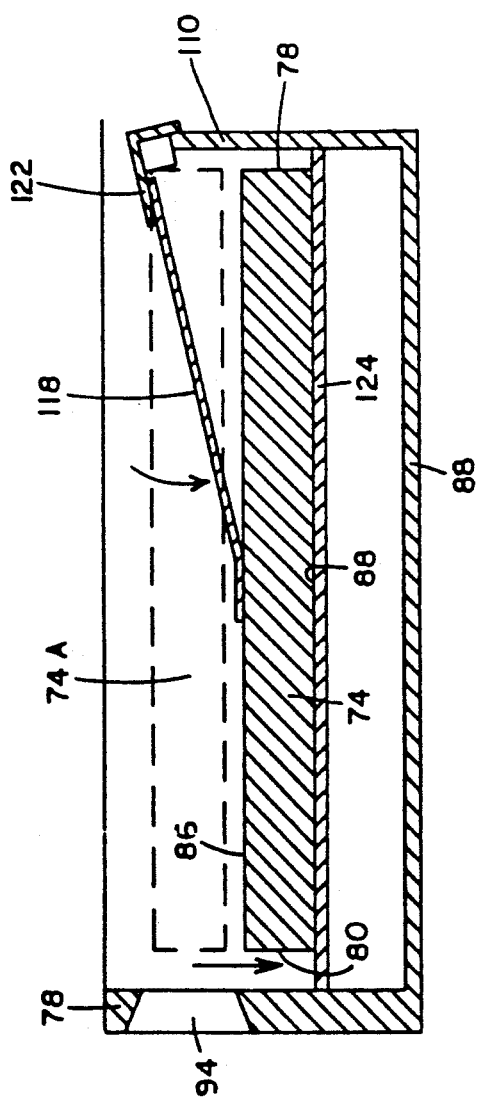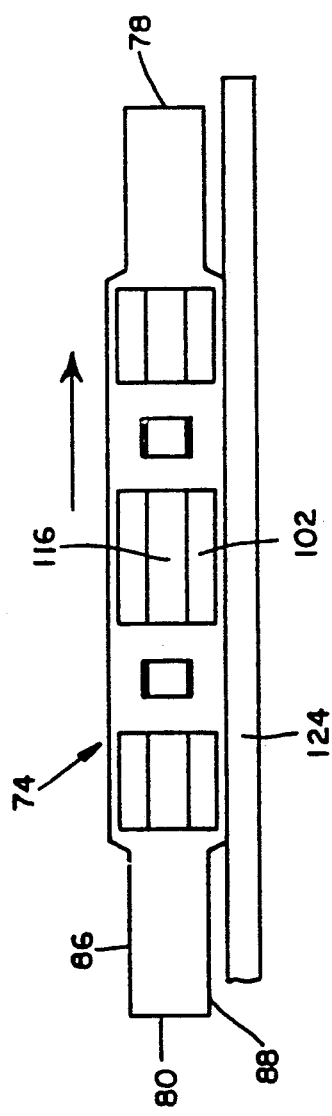
FIG. 13
FIG. 21
FIG. 8E
FIG. 9

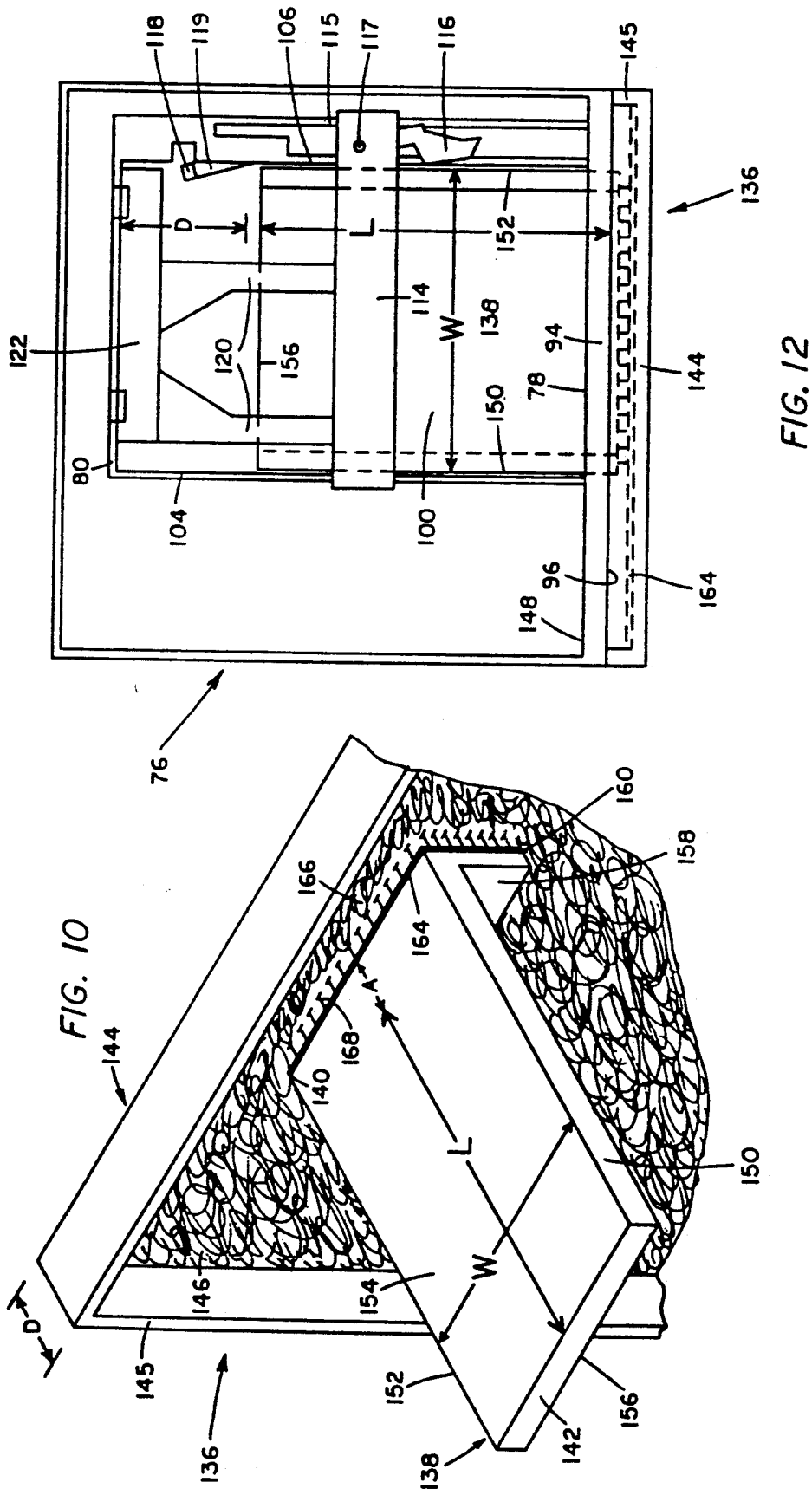

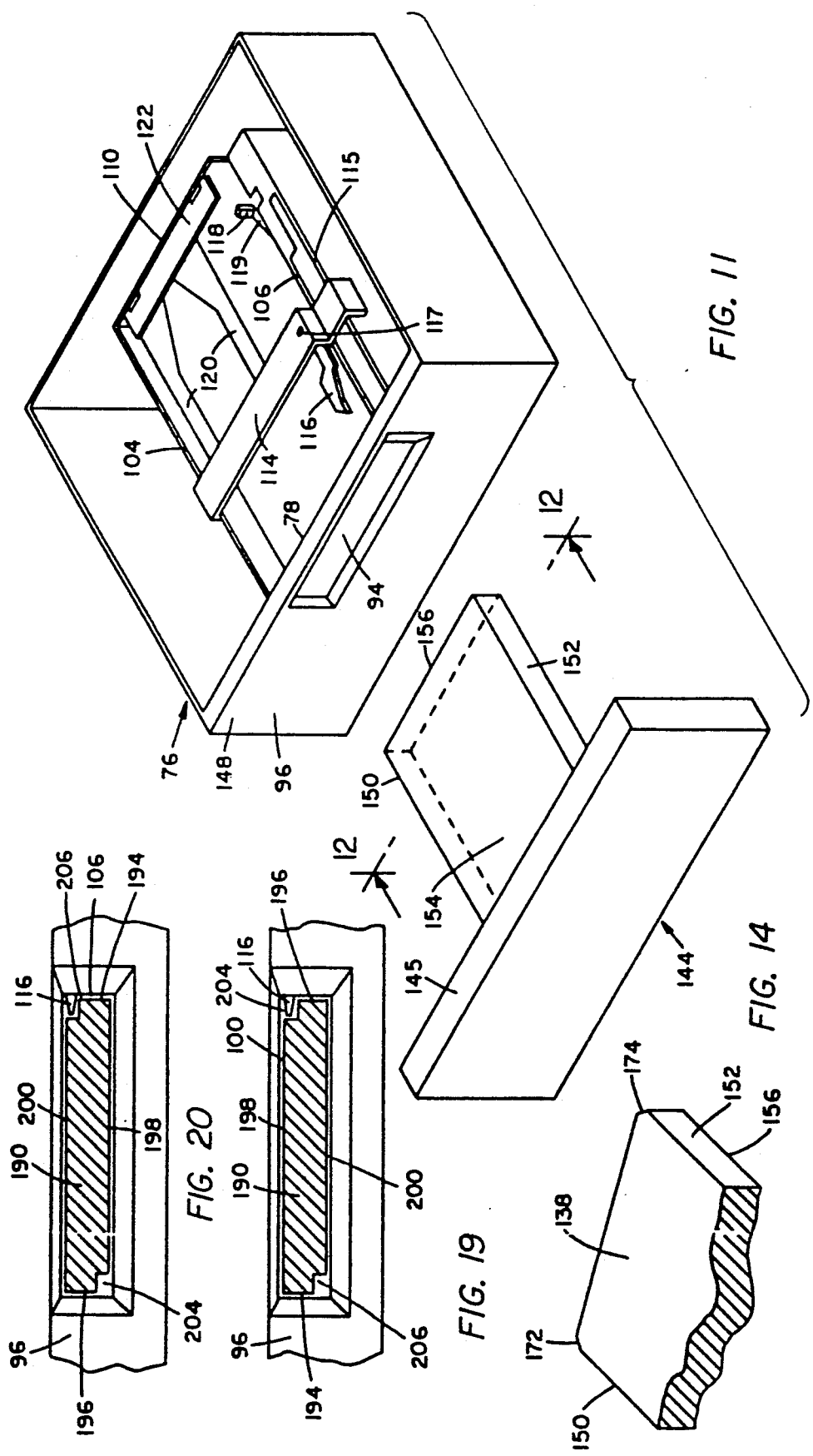

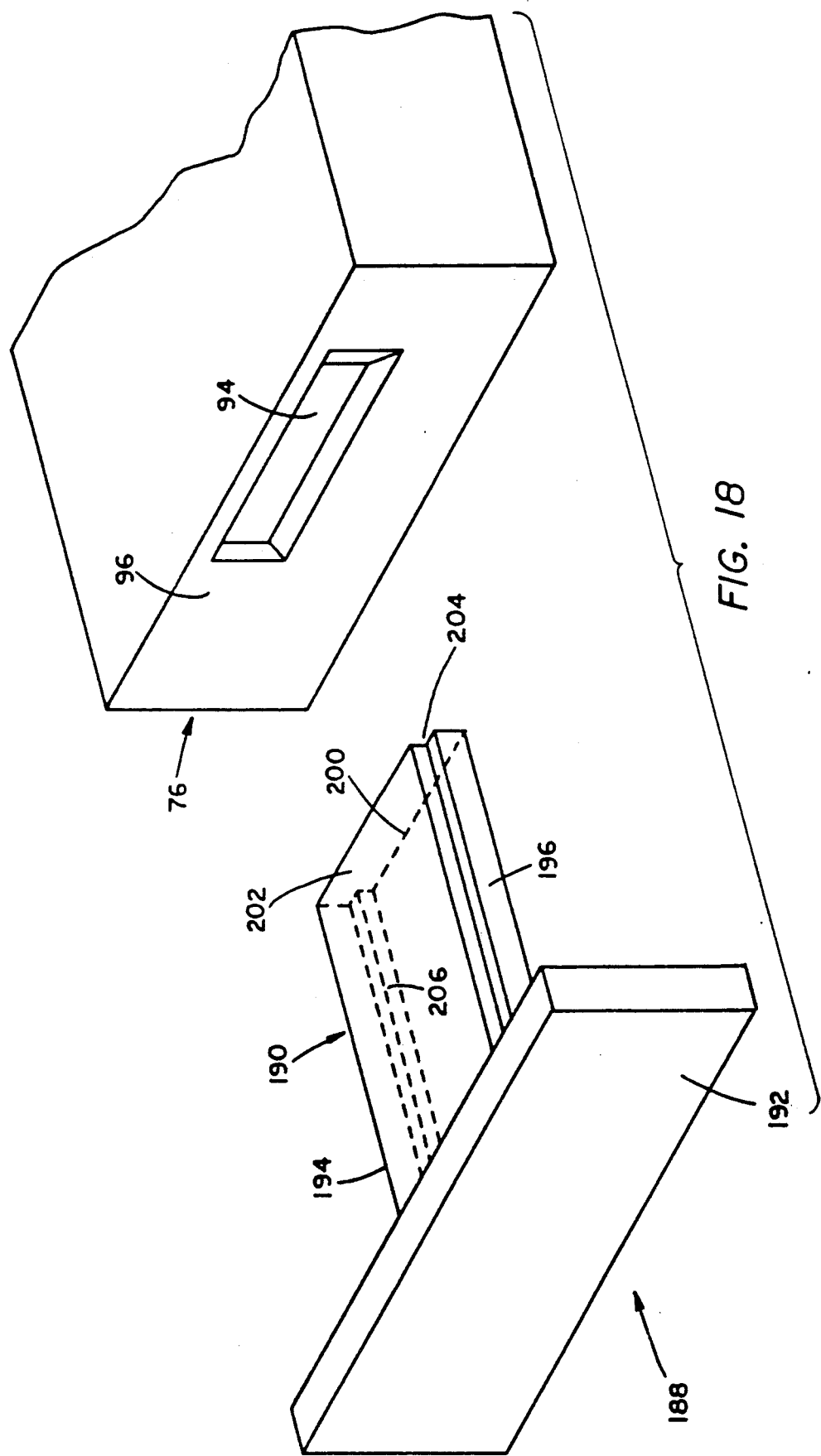

MOTOR VEHICLE RADIO-CASSETTE CAMOUFLAGE SYSTEM

HISTORY OF THE INVENTION

This invention is a continuation-in-part of an application Ser. No. 182,732, filed Apr. 18, 1988, entitled "Motor Vehicle Radio-Cassette Unit Camouflage System", now U.S. Pat. No. 4,918,750.

FIELD OF THE INVENTION

This invention relates to motor vehicle security systems in general and to security systems for radio-cassettes in particular.

BACKGROUND OF THE INVENTION

Virtually every car has a cassette-radio unit. Car radio theft is an acknowledged problem, one that is not a problem isolated to inner cities or high performance cars with high fidelity sound systems. Replacing a stolen radio and repairing interior damage is a costly prospect for the owner.

It is an accepted fact that by removing the radio-cassette unit from view there is an added degree of deterrence against car break-in and radio-cassette unit theft.

A sophisticated type of cassette loading system known as "soft load" or "mechanical load" or "motorized transport" is presently being used in car radio-cassette units. One such type of soft-load unit is manufactured by Matsushita Communication Industrial Co., Ltd., Japan, as Model No. SOA416E121 mounted in the Suburu automobile. The soft-load system is designed to utilize the standard design of a cassette. The standard cassette has one raised side defining a series of holes including a central hole. The user end loads a cassette into the cassette recess of a radio-cassette unit with the raised side being keyed into a keyway of the aperture of the cassette recess on the right as viewed by the user. A biasable narrow engaging finger in the radio-cassette unit grips the cassette at the middle hole. The inner end of the cassette at this time triggers a switch in the cassette recess that controls a driver such as a motor operatively connected to a radio-cassette unit cassette carrier, which is mounted to the engaging finger. This latter event activates the motor, which pulls the cassette carrier in an inward direction along with the engaging finger. The cassette is likewise pulled inwardly to the end of the cassette recess, whereupon the cassette is forced down by a pressing mechanism to the play position. Upon termination of the tape the cassette is pressed up where the engaging finger again grips the cassette at the middle hole and the driver then pushes the cassette carrier along with the cassette outwardly until the outer end of the cassette extends beyond the aperture of the cassette recess of the radio-cassette unit, where the user can pull the cassette from the cassette recess.

DESCRIPTION OF THE PRIOR ART

U.S. Pat. No. 4,584,717 issued to Strickland on Apr. 22, 1986 describes a tab, or tongue member, in engagement with upper and lower brackets connected to the inside wall of a casing, or cover, for the radio-cassette unit. The preferred embodiment of the tab is a typical tape cassette.

It is apparent that when the Strickland apparatus is used for the soft-load cassette system, the typical cassette used for the Strickland patent could very well be pulled from its engagement with the upper and lower brackets, causing the casing to fall away from the radio-cassette unit. The cassette will be further pulled into the cassette recess where it will begin to play until completion of the tape at which time it will be ejected from the radio-cassette unit.

U.S. Pat. No. 4,365,280 issued to Crosetti on Dec. 21, 1982 describes a blank, or tongue, of a substantially rectangular configuration insertable within a cassette recess of a radio-cassette unit. The blank is connected to the back surface of a face plate, or cover, which covers indicia and controls of the relatively expensive radio-cassette unit and also has indicia representing an inexpensive radio dial indicator so as to disguise the relatively expensive radio-cassette unit.

The blank of Crosetti is not adapted to be operable with the soft-load system. In column 3, lines 13–16 of Crosetti it is stated, "The blank 9 has appropriate dimensions to provide a snug fit with the eight track cartridge receiving receptacle defined by the tape system housing." Thus, the Crosetti blank would trigger the driver switch of the soft-load system. Also, Crosetti describes protuberances 6, which as illustrated would make contact with the driver switch of the soft-load system more likely. Thus, there is no assurance that either the forward edge of the blank or the forward (described in Crosetti as rearward) protuberances of the blank will avoid contact with the driver switch that activates the driver of the cassette carrier. As long as a blank of Crosetti is in the cassette recess in contact with the driver switch, the driver will continue to operate causing the radio-cassette unit to malfunction.

SUMMARY OF THE INVENTION

Accordingly, it is a principle object of this invention to provide a camouflage system that completely covers the entire front unit of a radio-cassette unit mounted in the dashboard of a motor vehicle.

It is another object of this invention to provide a camouflage system for a radio-cassette unit of a motor vehicle which can be easily mounted over or removed from the unit.

It is another object of this invention to provide a camouflage system for a radio-cassette unit which is adjustable by a user to accommodate the system to any variation or manufacturing discrepancy in the location of the cassette recess of the user's particular radio-cassette unit make or model.

It is another object of this invention to provide a camouflage system for a soft-load radio-cassette unit of a motor vehicle.

It is another object of this invention to provide a camouflage system that can be maintained in position while the driver simultaneously operates his vehicle and the car radio.

In accordance with the above objects and others which will become apparent hereinafter, there is provided a radio-cassette unit camouflage system for a radio-cassette unit removably mounted in the dashboard of a motor vehicle. The radio-cassette unit camouflage system includes a cover removably positioned at the dashboard for concealing the radio-cassette unit from view and a tongue member connected to the cover removably positioned in the cassette recess of the radio-cassette unit so as to act as a keeper which holds the cover in place over the radio-cassette unit around the frame. The tongue member is adapted to be positioned in the cassette recess of a soft-load radio-cassette unit with the tongue member arranged and constructed to avoid the switch for the motor of the mechanical loader. Another embodiment of the tongue member is adapted to avoid both the motor switch and the engaging finger of the cassette recess. The tongue member is removably positioned in the cassette recess by way of a hook-and-loop fastener with the hook element mounted to and covering the base at the inner end of the tongue member and the loop element covering the inner surface of the cover so that the tongue member can be positioned at any position on the cover found with the various locations of the cassette recess of the different models and manufacturers of radio-cassette units.

The preferred type of hook-and-loop fastener is the type manufactured by the Velcro U.S.A., 406 Brown Ave., P.O. Box 4086, Manchester, N.H. 03018 marketed as Velcro ® Hook Style No. 8 and Veloro ® Loop Style No. 1000". Hook Style No. 8 is described in U.S. Pat. No. 3,758,657 issued Sep. 11, 1973, to Menzin et al. and in U.S. Pat. No. 3,762,000 issued Oct. 2, 1973, to Menzin. Hook Style No. 1000 is described in U.S. Pat. No. 3,114,951 issued Dec. 24, 1963, to DeMestral.

The present invention will be better understood and the objects and important features, other than those specifically set forth above, will become apparent when consideration is given to the following details and description, which when taken in conjunction with the annexed drawings, describes, discloses, illustrates, and shows preferred embodiments or modifications of the present invention and what is presently considered and believed to be the best mode of practice in the principles thereof. Other embodiments or modifications may be suggested to those having the benefit of the teachings herein, and such other embodiments or modifications are intended to be reserved especially as they fall within the scope and spirit of the subjoined claims.

BRIEF DESCRIPTION OF THE DRAWINGS

FIG. 4 is a sectional side view of the radio-cassette unit camouflage system taken through line 4—4 of FIG. 3;

FIG. 6 is a sectional side view of an alternate embodiment of the radio-cassette unit camouflage system having an adjustable mounting tongue;

FIG. 7 is a view taken through line 7—7 of FIG. 6;

FIG. 8B illustrates a simplified partial top view of the cassette and cassette recess shown in FIG. 8A with the cassette partially loaded into the cassette recess;

FIG. 8C illustrates a continuation of the loading process begun in FIGS. 8A and 8B with the cassette carrier having been activated so as to pull the cassette further into the cassette recess;

FIG. 8D illustrates a continuation of the loading process illustrated in FIG. 8C with the cassette having been pulled fully into the cassette recess;

FIG. 8E is a simplified side view of the cassette and cassette recess shown in FIGS. 8A-8D illustrating a continuation of the loading process with the cassette having been pressed downwardly into the play position;

FIG. 10 is a simplified side view of the engaging finger of a soft-load radio-cassette unit engaging the middle side hole of a cassette;

FIG. 10 is a perspective view of a radio-cassette unit camouflage system adapted for a soft-load radio-cassette unit and with a tongue member having a rectangular configuration adjustably mounted to a cover member;

FIG. 11 is a perspective view of the radio-cassette unit camouflage system shown in FIG. 10 about to be inserted into the cassette recess of a soft-load radio-cassette unit;

FIG. 12 is a top view illustrating the radio-cassette unit camouflage system shown in FIGS. 10 and 11 fully positioned in the cassette recess of a soft-load radio-cassette unit;

FIG. 13 is an isolated sectional frontal view of the side of the tongue member of the radio-cassette unit camouflage system shown in FIG. 12;

FIG. 14 is a broken perspective view of the radiocassette unit camouflage system shown in FIGS. 10-13 having rounded front edges;

FIG. 18-21 are perspective views of another embodiment of a radio-cassette unit camouflage system having a tongue member with side channels about to be inserted into a cassette recess of a soft-load radio-cassette unit;

DETAILED DESCRIPTION OF THE PREFERRED EMBODIMENT

Figure 1:
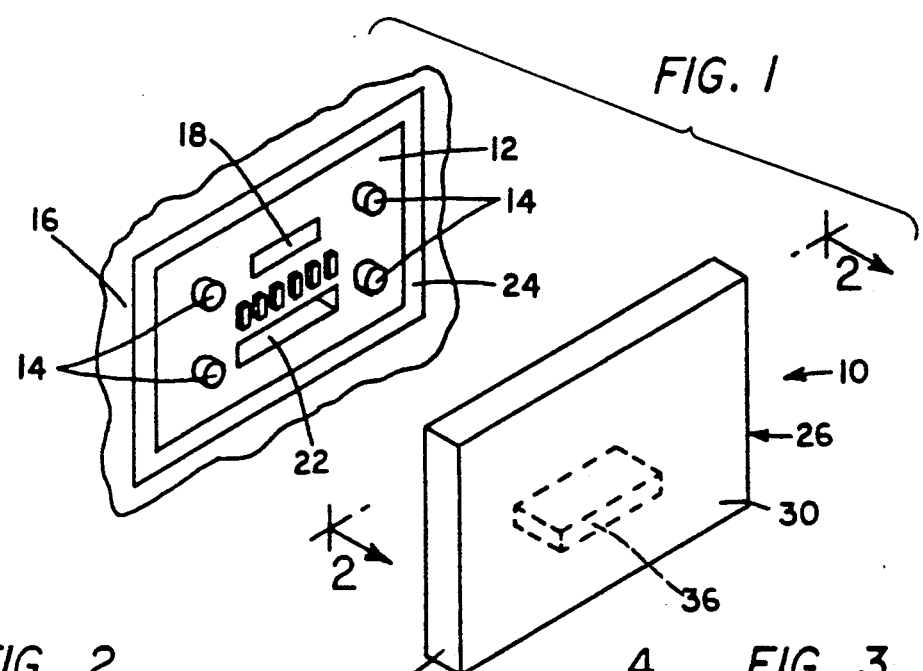
FIG. 1 is a perspective view of a radio-cassette unit camouflage system in the process of being mounted over a radio-cassette unit at the dashboard of a motor vehicle.

Reference is now made specifically to the drawings in which identical or similar parts are designated by the same reference numerals throughout.

FIG. 1 illustrates a theft prevention radio-cassette unit camouflage system 10 for a radio-cassette unit including auditory control dials 14 which is removably mounted in the dashboard 16 of a motor vehicle. Auditory control dials 14 are illustrated for purposes of exposition only and it is to be understood that dials 14 represent any type of controls, such as buttons, which may be present on any of the various models of radio-cassette units. A radio dial 18 is shown at the to of radio-cassette unit 12 with radio dial control buttons 20 shown just below dial 18. A rectangular cassette recess 22 is located at the bottom of radio-cassette unit 12 below dial buttons 20. Radio-cassette unit 12 is removably positioned in a frame 24, which in turn is mounted in dashboard 16. Radio-cassette unit camouflage system 10 is capable of being placed in a camouflage position over frame 24 and radio-cassette unit 12 at dashboard 16.

Figure 2:
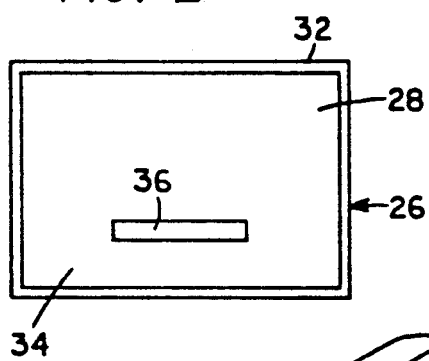
FIG. 2 is an inner view of the radio-cassette unit camouflage system taken through plane 2—2 of FIG. 1.
Figure 3:
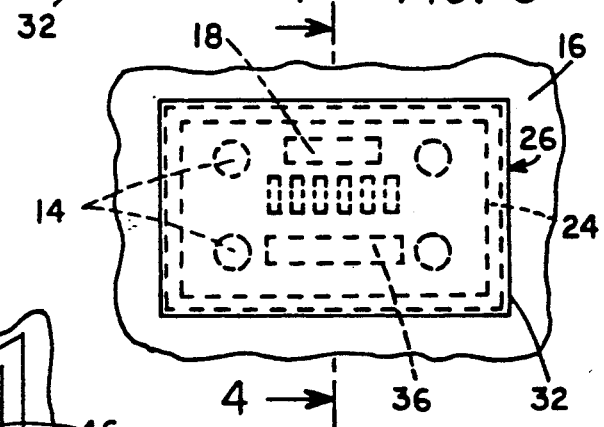
FIG. 3 is an outside view of the radio-cassette unit camouflage system when mounted in the camouflage mode over the radio-cassette unit in the dashboard.

FIGS. 1 and 2 illustrate a rectangular cover 26 in the process of being removably positioned at dashboard 16 so as to conceal radio-cassette unit 12 from view; and FIGS. 3-4 illustrate cover 26 positioned in its covering camouflage mode over radio-cassette unit 12 and frame 24. Cover 26 has opposed rectangular inner and outer flat surfaces 28 and 30, respectively, relative to dashboard 16 and includes a protruding lip 32 extending transversely from the rectangular edge of inner surface 28 towards dashboard 16. Inner surface 28 and lip 32 define a rectangular hollow space 34. Cover 26 overlies both radio-cassette unit 12 and frame 24 with lip 32 in contact with dashboard front surface 35. Dial buttons 20 and auditory control dials 14 are positioned in hollow space 34 when cover 26 is mounted over radio-cassette unit 12.

A tongue member 36 rectangular in cross-section having opposed inner and outer ends 38 and 40, respectively, is connected to cover 26. Inner end 38 is connected to inner surface 28 of cover 26. Tongue member 36 with outer end 40 is capable of being removably positioned in cassette recess 22 when cover 26 is mounted over radio-cassette unit 12 so that tongue member 36 acts as a grip holding cover 26 in place around frame 24.

Front surface 35 of dashboard 16 has a decorative scheme which outer surface 30 generally matches so that an observer from outside the vehicle would see only a generally uniform front surface of dashboard 16 without seeing radio-cassette unit 12.

Figure 5:
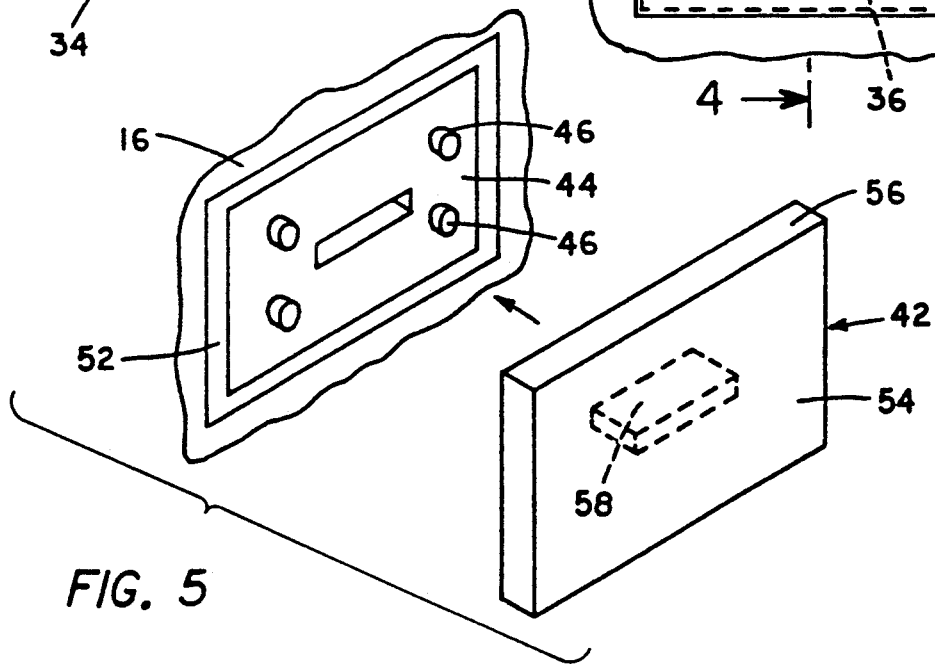
FIG. 5 is a perspective view of a radio-cassette unit camouflage system in the process of being mounted over a dashboard radio-cassette unit.

FIG. 5 illustrates a theft prevention camouflage system 42 for a radio-cassette unit 44 including auditory controls, shown as dials 46 (although control buttons are also used in the art) removably mounted in a dashboard 16 of a motor vehicle. A cassette recess 50 rectangular in cross-section is located in the middle area of radio-cassette unit 44. Radio-cassette unit 44 is removably positioned in a frame 52, which in turn is mounted dashboard 16. Camouflage system 42 is capable of being placed in a camouflage position over frame 52 and radio-cassette unit 44 at dashboard 16. A rectangular cover 54 analogous to cover 26 described above is shown in the process of being removably positioned at dashboard 16 so as to conceal radio-cassette unit 44 from view. Cover 54 has opposed rectangular inner and outer flat surfaces relative to dashboard 16 and includes a protruding lip 56 extending transversely from the rectangular edge of the inner surface towards dashboard 16. The inner surface of cover 54 and lip 56 define a rectangular hollow space analogous to hollow space 34 of cover 26 described earlier. Cover 54 overlies both radio-cassette unit 44 and frame 52 with lip 56 in contact with the front surface of dashboard 16. Auditory control dials 46 are positioned in the hollow space when cover 54 is mounted over radio-cassette unit 44. Cover 54 includes a tongue member 58 rectangular in cross-section having opposed inner and outer ends relative to the inner surface of cover 54 with the inner end connected to the inner surface of cover 54. Tongue member 58 is removably positioned in cassette recess 50 when cover 54 is mounted over radio-cassette unit 44 so that tongue member 58 acts as a grip holding cover 54 in place around frame 52. The front surface of cover 54 has a decorative scheme which generally matches the dashboard outer surface so that an observer from outside the vehicle would see only a generally uniform front surface of dashboard 16 without seeing radio-cassette unit 44.

An alternate embodiment of the invention is illustrated in FIGS. 6 and 7 where a cover 26A has been placed in its camouflage position over a radio-cassette unit 60 and its frame 24A with its lip 32A in contact with a dashboard 16. A tongue member 36A rectangular in cross-section has its outer end 40A mounted in a cassette recess 22A in radio-cassette unit 60. A rectangular base portion 62 having opposed inner and outer sides 64 and 66, respectively, is connected to inner end 38A of tongue member 36A at outer side 66. Tongue member 36A is removably secured to inner flat surface 28A of cover 26A by a releasable fastener, namely, a hook-and-loop fastener 68, which includes a hook element 70 which is attached to outer side 66 of base portion 62 and a loop element 72 which is attached to the entire inner flat surface 28A. Hook-and-loop fastener 68 preferably is the type of hook-and-loop fastener manufactured by Velcro U.S.A., the hook element described in U.S. Pat. No. 3,758,657 issued Sep. 11, 1973, to Menzin et al., U.S. Pat. No. 3,762,000 issued Oct. 2, 1973 to Menzin, and the loop element described in U.S. Pat. No. 3,114,951 issued Dec. 24, 1963 to DeMestral. Tongue member 36 is adapted to be connected to a selected location on inner flat surface 28A so as to be aligned with any location of the cassette recess of various types of radio-cassette units. For example, as illustrated in phantom line in FIGS. 6 and 7, tongue member 36A along with base portion 62 and hook element 70 can be released from connection by hook-and-loop fastener 68 to inner flat surface 28A and moved to another location indicated as tongue member 36B and there attached by hook element 70B to loop element 72B at inner surface 28A. The new position of tongue member 36B is aligned with a cassette recess 22B of another model of radio-cassette unit. By this embodiment, the manufacturer of the radio-cassette unit camouflage system can manufacture a minimum number of sizes of camouflage covers which can be adapted to be mounted to a wide range of various radio-cassette unit brands and models.

FIGS. 8A-8E illustrate a typical, standard cassette 74 being mounted into a soft-load type radio-cassette unit 76. Standard cassette 74 includes front and rear walls 78 and 80, respectively, left and right side walls 82 and 84, respectively, and top and bottom walls 86 and 88, respectively. Right side wall includes a raised key portion 90 which fits into a keyway 92 at the right side of a rectangular aperture 94 defined at the front face 96 of soft-load radio-cassette unit 76. Aperture 94 opens to a rectangular cassette recess 100 defined by soft-load radio-cassette unit 76. Right side wall 84 defines a centrally located side rectangular side hole 102.

The interior of soft-load radio-cassette unit 76 is simplified for purposes of exposition and can vary in some details according to different models and manufacturers. A cassette recess is defined within soft-load radio-cassette unit 76 by left and right cassette recess side walls 104 and 106, respectively, and front and rear walls 108 and 110, respectively, front wall 108 being spaced from front face 96 of radio-cassette unit 76. A movable carriage 114 extending transversely across cassette recess 100 rides along left side wall 104 and a rail wall 115 lateral to and slightly spaced from right side wall 106 from the forward position shown in FIG. 8A to a rearward position. A biasable engaging finger 116 is pivotably mounted to the right side of carriage 114 at pivot pin 117. A biasable switch 118 including a forward portion 119 extending toward aperture 94 for activating and deactivating a motor (not shown) which moves carriage 114 between its forward position and its rearward position by mechanisms (not shown) is pivotably mounted to the interior of soft-load radio-cassette unit 76. Both engaging finger 116 and switch 118 are rotatable about vertical axes and both are illustrated in the unbiased mode in FIG. 8A.

Portions of both engaging finger 116 and switch 118 are located in cassette recess 100, specifically proximate to right side wall 106. A pair of spaced flat hold-down bar 120 aligned in front to rear alignment each have one end slidably mounted under carriage 114 and the other end connected to an upwardly biased press-down bar 122 hinged to rear wall 110. A pair of rails 124 upon which tongue member 138 rides are rotatable from a raised position as shown in FIG. 8A to a lowered position along the bottom wall 125 of soft-load radio-cassette unit 76.

Figure 8A:
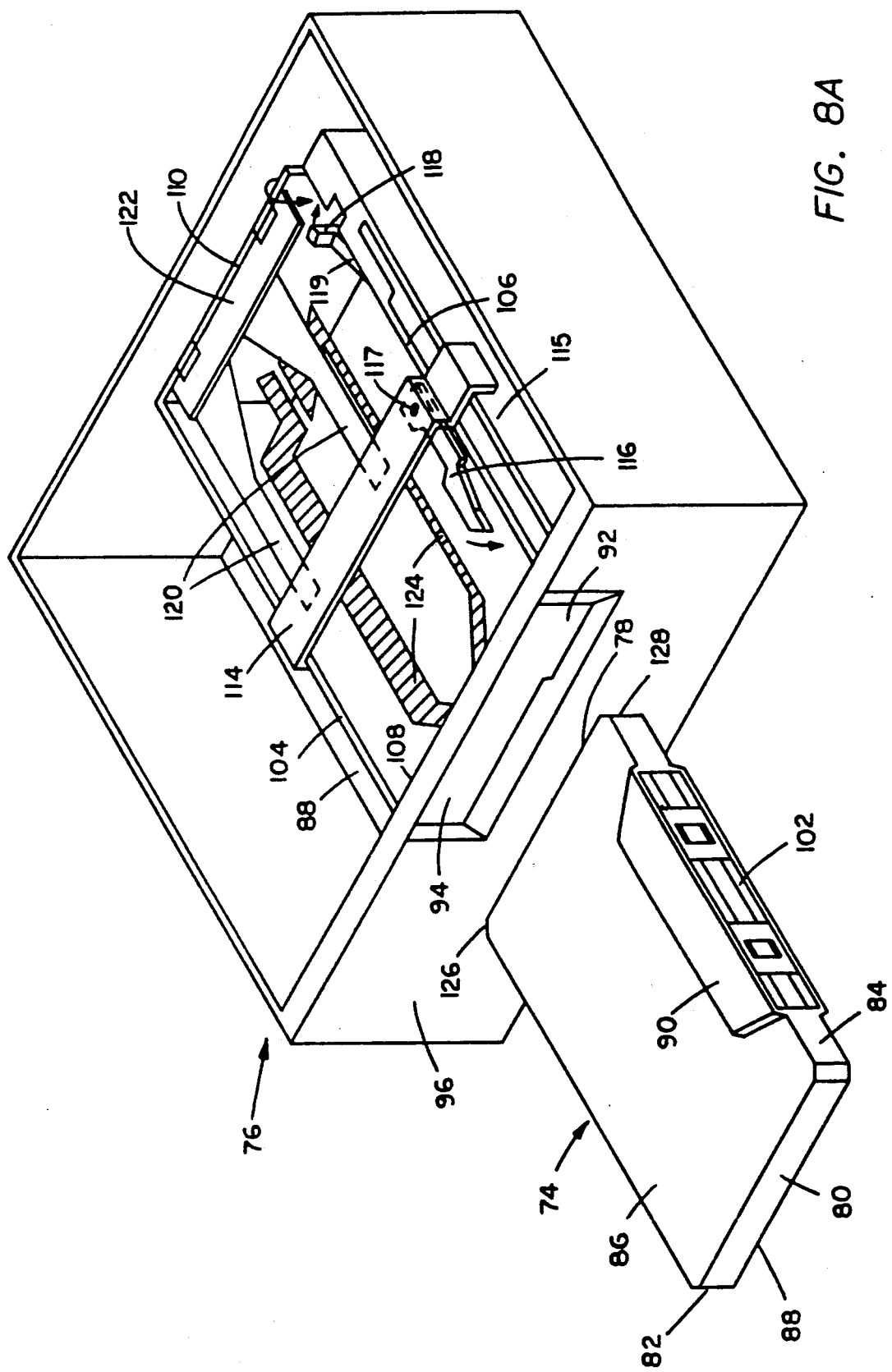
FIG. 8A is a perspective view of a typical cassette about to be inserted into the cassette recess of a soft-load radio-cassette unit taken in isolation showing selected control elements.

FIG. 8B illustrates cassette 74 having been inserted a distance into cassette recess 100 sufficient that cassette right side wall 84 presses engaging finger 116 into a biased mode. Cassette 74 defines vertical left and right rounded edges 126 and 128 at front wall 78 and left and right side walls 82 and 84, respectively. Right rounded edge 128 first meets engaging finger 116 so as to avoid impact. FIG. 8C illustrates cassette 74 having been inserted a further distance into cassette recess 100 sufficient to have two events occur: first, engaging finger 116 has reached and has been biased into side hole 102; and second, front wall 78 and right side wall 84 of cassette 74 have reached and moved a forward platform portion of switch 118 into a biased mode, such moving activating the motor of cassette unit 76 so that movement of carriage 114 is initiated. FIG. 8C illustrates cassette 74 having been pulled by carriage 114 into a final inward position in cassette recess 100 by way of engaging finger 116 locking into cassette 74 at side hole 102. Engaging finger 116 has been disengaged from side hole 102 by a cam 130. Finally, as illustrated in FIG. 8E, cassette 74 is pressed downward from its up position 132 shown in phantom line as 74A to its final play position 134 in cassette recess 100 by press-down bar 122 and hold-down bars 120 by mechanisms (not shown) initiated by carriage 114, with the dropping of rails 124 also being included in the action of the mechanisms. The return and ejection of cassette 74 from cassette recess 100 are similar in reverse order from the movements shown in FIGS. 8A-8E. FIG. 9 illustrates in isolated side view engaging finger 116 locked into side hole 102 of cassette 74.

A radio-cassette unit camouflage system 136 adapted for being removably mounted to soft-load radio-cassette unit 76 is illustrated in FIGS. 11-14. A tongue member 138 rectangular in cross-section having an inner end 140 and an opposed front end 142, respectively, is connected to a cover 144, which is analogous to cover 26 described earlier. Inner end 140 is connected to an inner surface 146 of cover 144. Cover 144 includes a rectangular rim wall 145 and opposed inner and outer surfaces 146 and 147, respectively. Tongue member 138 is capable of being removably positioned in cassette recess 100 when cover 144 is mounted over radio-cassette unit 76 so that tongue member 138 acts as a grip, or keeper, which holds cover 144 in place around a frame 148 with rim wall 145 being in contact with front face 96 of radio-cassette unit 76 or with the front face of the car panel (not shown) adjoining front face 96. Rectangular tongue member 138 includes opposed left and right side walls 150 and 152, respectively, and opposed top and bottom walls 154 and 156, respectively. Inner end 140 includes an L-shaped base portion 158 having an outer side 160 connected to inner surface 146 of cover 144 by a releasable fastener, namely, a hook-and-loop fastener 164, which includes a hook element 166, which is attached to outer side 160 of base portion 158 and a loop element 168 which is attached to the entire area of inner surface 146. Hook-and-loop fastener 164 preferably is the type of hook-and-loop fastener manufactured by Velcro U.S.A., the hook element described in U.S. Pat. No. 3,758,657 issued Sep. 11, 1973, to Menzin et al., U.S. Pat. No. 3,762,000 issued Oct. 2, 1973, to Menzin et al. and the loop element described in U.S. Pat. No. 3,114,951 issued Dec. 24, 1963 to DeMestral. Tongue member 138 can be connected to a selected location on inner surface 162 so as to be aligned with any location of the cassette recess of various types of radio-cassette units.

Switch 118 is positioned in cassette recess 100 at a distance D from aperture 94 as measured from front face 96, and tongue member 138 has an operative length L also measured from front face 96 when tongue member 138 is positioned in cassette recess 100. The actual length of tongue member 138 is the operative length L plus the depth A of tongue member 138 between the inner end of length L and inner surface 146 of cover 144. Length L is less than distance D, so that tongue member 138 does not activate switch 118 when tongue member 138 is positioned in cassette recess 100. Because cassette 74 is standard in dimensions including the location of side hole 102, the dimensions of cassette recess 100 and the operative positions of engaging finger 116 and switch 118 are likewise standard in the various manufacturers and models of radio-cassette units. Tongue member 138 has a width W, which is approximately the same as the width of standard cassette 74.

FIG. 12 illustrates radio-cassette unit system 136 operatively mounted in relation to soft-load radio-cassette unit 76 with tongue member 138 in its keeper mode within cassette recess 100. Front edge 156 is slightly spaced from contact with switch 118, in particular slightly spaced from contact with forward portion 119. Left and right side walls 150 and 152 are slightly spaced from cassette left and right side walls 104 and 106, respectively. The keeper function of tongue member 138 is thus maximized without activating switch 118.

FIGS. 12 and 13 illustrated right side wall 152 of tongue member 138 having pressed engaging finger 116 into a biased mode from its unbiased mode as shown in FIG. 8A.

FIG. 14 illustrates cassette 74 defining vertical left and right rounded edges 170 and 172 at front end 142 and left and right side walls 150 and 152, respectively, extending between top and bottom walls 154 and 156. Right rounded edge is analogous to right rounded edge 128 of cassette 74. Right rounded edge 172 first meets engaging finger 116 so as to avoid sharp impact. Whenever tongue member 138 is rotated to a orientation inverse to that illustrated in FIG. 12 in order to align tongue member 138 differently, left rounded edge 126 then assumes the position of right rounded edge 128 and then first meets engaging finger 116 so as to avoid sharp impact.

Figure 16:
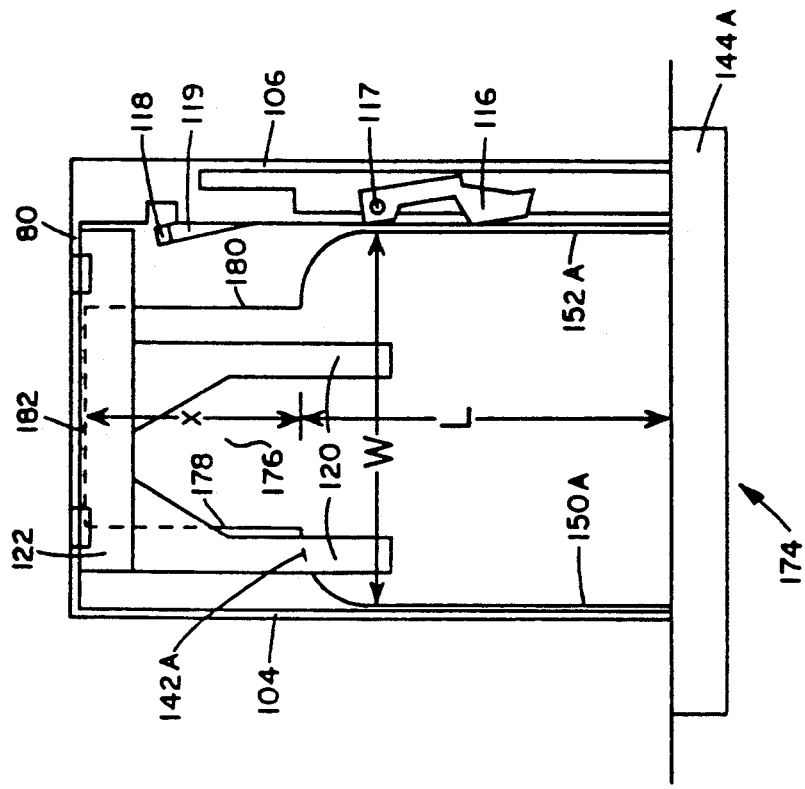
FIG. 16 is a simplified top view of the radio-cassette unit camouflage system shown in FIG. 15 in a fully inserted position in the cassette recess shown in isolation.
Figure 15:
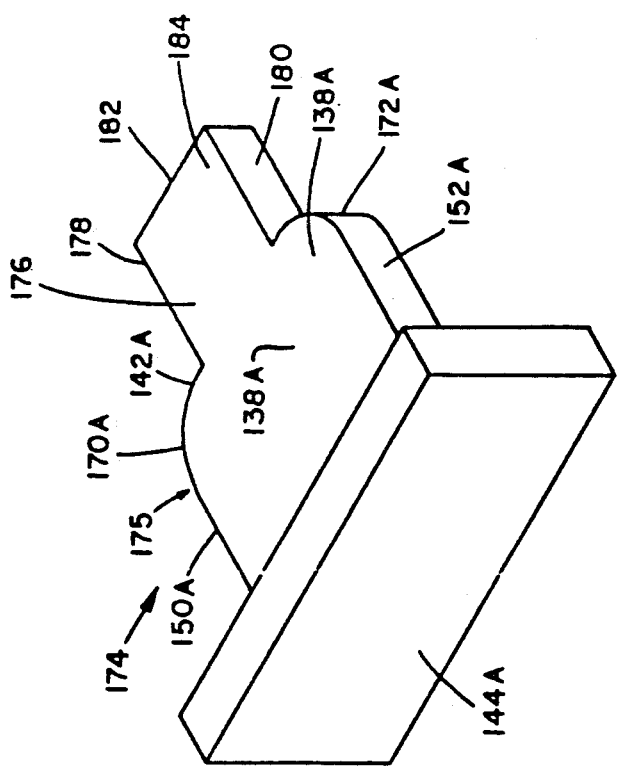
FIG. 15 is a perspective view of another embodiment of a radio-cassette unit camouflage system for a soft-load radio-cassette unit having a tongue member with a middle extension portion.
Figure 17:
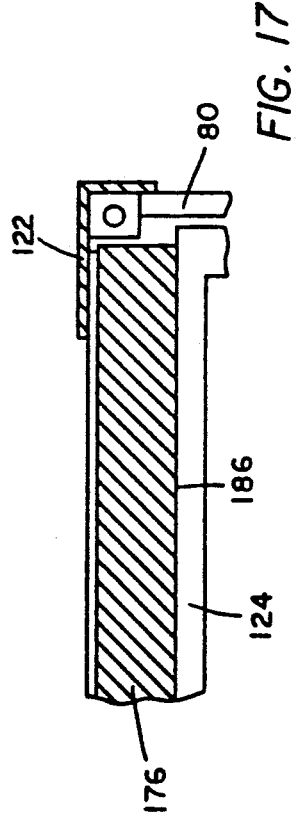
FIG. 17 is a partial and schematic side view of the forward portion of the radio-cassette unit camouflage system illustrated in FIGS. 15 and 16.

FIGS. 15, 16, and 17 illustrate a radio-cassette unit camouflage system 174 having a cover 144A and an attached tongue member 175 including a rectangular tongue portion 138A analogous to tongue member 138 of camouflage system 136 and including a front end 142A having rounded vertical edges 170A and 172A analogous to rounded edges 170 and 172. Tongue member 175 also includes a rectangular middle portion 176 extending from front end 142A of tongue portion 138A. Middle portion 176 has opposed middle portion left and right side walls 178 and 180, respectively, a middle portion front end wall 182, and opposed middle portion top and bottom walls 184 and 186. Left and right walls 178 and 180 are oriented lateral to cassette recess left and right side walls 104 and 106, respectively. As illustrated in FIG. 16, right side wall 78 is spaced slightly away from switch 118. If the orientation of radio-cassette unit camouflage system 174 were inverted, or reversed, specifically if the orientation tongue member 190 were inverted so that top and bottom walls 184 and 186 were reversed from their positions just described, left side wall 178 would likewise be spaced slightly away from and thus avoid contact with switch 118. End wall 182 is spaced proximate to rear wall 80 of cassette recess 100. Front end 142A extends inwardly a distance L from front face 96 just short of contact with forward portion 119 of switch 118. Middle portion 176 extends inward a distance X to middle portion end wall 182 which is proximate to rear wall 80. In the mounted position illustrated in FIG. 16 and in the partial sectional view of FIG. 17, bottom wall 186 rests upon rails 124 and top wall 184 is positioned against hold-down bars 120. The top and bottom restriction of middle portion 176 at top and bottom walls 184 and 186 increases the efficiency of the keeper function of tongue member 175.

FIGS. 18, 19, 20, and 21 illustrate a radio-cassette unit camouflage system 188 including a generally rectangular tongue member 190 analogous to tongue member 138 of radio-cassette unit camouflage system 136 removably connected to a cover 192 analogous to cover 144. Tongue member 190 includes opposed left and right side walls 194 and 196, respectively, opposed top and bottom walls 198 and 200, respectively, and a front end wall 202. A bypass channel 204 is defined by tongue member 190, which is in particular by right side wall 194, top wall 198, and front end wall 202. Channel 204 extends from front end wall 202 to cover 192. As shown in FIGS. 19 and 21, channel 204 accommodates engaging finger 116 during and after insertion of tongue member 190 into cassette recess 100 so that tongue member 190 remains in an unbiased mode. The depth X and the width Y of channel 204 as shown in FIG. 21 are sufficient, including tolerances, to accommodate the thickness and vertical placement of finger 116 in cassette recess 100 and the horizontal extension of finger 116 into cassette recess 100.

Tongue member 190 defines another bypass channel 206, which is in particular defined by left side wall 194, bottom wall 200, and front end wall 202 extending to cover 192. Bypass channel 206 accommodates engaging finger 116 when tongue member 190 is inverted during insertion and when fully mounted into cassette recess 100, so that engaging finger 116 remains in an unbiased mode, as is illustrated in FIG. 21.

The embodiment of the invention particularly described and disclosed herein is presented merely as an example of the invention. Other embodiments, forms, and modifications of the inventions coming within the proper scope and spirit of the appended claims will, of course, readily suggest themselves to those skilled in the art.

What is claimed is:

1. A theft prevention camouflage system for a radio-cassette system for a radio-cassette unit removably mounted in the dashboard of a motor vehicle, the unit having a cassette recess, a cassette carrier, a driver operatively connected to the cassette carrier, and an on-off switch for the driver, the radio-cassette unit defining an aperture opening to the cassette recess, the switch extending into the cassette recess at a distance from the aperture, including, in combination, cover means capable of being removably positioned at the dashboard for concealing the radio-cassette unit from view, and tongue means connected to said cover means, said tongue means being for being removably positioned in the cassette recess so as to hold said cover means in place around the radio-cassette unit, said tongue means being constructed and arranged so as not to activate the switch when positioned in the cassette recess, wherein said tongue means is a tongue member having opposed inner and outer ends, said inner end being connected to said cover means and said outer end being removably positioned in the cassette recess, said tongue member having an operative length measured from the aperture when said tongue member is positioned in said cassette recess to maintain said cover in position, said length being less than said distance, wherein said tongue member does not activate the switch, wherein the cassette recess of the radio-cassette unit includes opposed cassette recess side walls, opposed cassette recess front and rear walls, the cassette recess rear wall being opposed to the aperture, and a cassette recess bottom support supporting the recess side walls, the cassette recess front and rear walls, and the cassette recess bottom support, the recess side walls, the cassette recess front and rear walls, and the cassette bottom support defining the cassette recess, the switch being located in the cassette recess at a first distance from the cassette recess front wall and at a second distance from one of the cassette recess side walls; and wherein said tongue means is a tongue member including a tongue member front wall and a middle portion connected to and extending from the center of said tongue member front wall, said middle portion having at least one middle portion side wall located from the one of the cassette recess side walls at a distance slightly more than the second distance.

2. The theft prevention camouflage system according to claim 1, wherein said middle portion includes a middle portion end wall spaced from said tongue member front wall located proximate to the cassette recess rear wall.

3. The theft prevention camouflage system according to claim 2, wherein said tongue member includes a base portion at said inner end, said base portion having a base surface and further including connecting means secured to said base surface and to said inner surface of said cover wall for removably connecting said tongue member to said inner surface of said cover at a selected position in accordance with the location of the cassette recess.

4. The theft prevention camouflage system according to claim 3, wherein said middle portion has another middle portion side wall located from the other one of the cassette recess side walls slightly more than the second distance, whereby said tongue member can be inverted in orientation relative to said cover member and said cassette recess side walls thus avoiding contact with the switch.

5. The theft prevention camouflage system according to claim 1, the radio-cassette unit or cassette unit including an engaging finger movable between unbiased and biased modes a portion of the engaging finger being positioned in the cassette recess in the unbiased mode, and wherein said tongue member further includes bypass means for avoiding contact with the engaging finger when said tongue member is being positioned in the cassette recess.

6. The theft prevention camouflage system according to claim 5, wherein said tongue member includes opposed top and bottom walls connected to said side walls, one of said side walls being aligned with said engaging finger in the mounted in the cassette recess, and said bypass means includes said top wall and said one of said side walls defining a channel extending from said front end, said channel accommodating the engaging finger so that the engaging finger remains in the unbiased mode when said tongue member is mounted in said cassette recess in a first position.

7. The theft prevention camouflage system according to claim 6, wherein said bypass means further includes said bottom wall and the other of said side walls defining another channel extending from said front end, said another channel accommodating said engaging finger when said tongue member is mounted in said cassette recess in a second position inverted relative to said first position so that the engaging finger remains in the unbiased mode.

8. The theft prevention camouflage system according to claim 1, wherein said cover means includes inner and outer surfaces relative to the dashboard, said inner end of said tongue member being removably connected to said inner surface of said cover, and a hook-and-loop connector mounted to said cover means and to said tongue member, one element of said hook-and-loop connector being connected to the inner surface of said cover member and the other element of said hook-and-loop connector being connected to said inner end if said tongue, wherein said tongue member is removably connected to said inner surface of said cover means and is capable of being removably connected to said inner surface at a selected position by a user in accordance with the location of the cassette recess.

9. The theft prevention camouflage system according to claim 1, wherein the dashboard has a decorative scheme, said outer surface of said cover means being generally of said decorative scheme.

* * * * *